(12) United States Patent
Brogardh et al.

(10) Patent No.: US 10,166,684 B2
(45) Date of Patent: Jan. 1, 2019

(54) INDUSTRIAL ROBOT INCLUDING A PARALLEL KINEMATIC MANIPULATOR

(71) Applicant: ABB Research Ltd., Zurich (CH)

(72) Inventors: Torgny Brogardh, Vasteras (SE); Mats Isaksson, Victoria (AU)

(73) Assignee: ABB Research Ltd., Zurich (CH)

( * ) Notice: Subject to any disclaimer, the term of this patent is extended or adjusted under 35 U.S.C. 154(b) by 1369 days.

(21) Appl. No.: 13/790,530

(22) Filed: Mar. 8, 2013

(65) Prior Publication Data

US 2013/0189063 A1 Jul. 25, 2013

Related U.S. Application Data

(63) Continuation of application No. PCT/EP2011/064970, filed on Aug. 31, 2011, and a continuation of application No. PCT/EP2010/063310, filed on Sep. 10, 2010.

(51) Int. Cl.
*B25J 17/02* (2006.01)

(52) U.S. Cl.
CPC .......... *B25J 17/02* (2013.01); *B25J 17/0266* (2013.01)

(58) Field of Classification Search
CPC ..... B25J 9/02; B25J 9/048; B25J 9/051; B25J 9/06; B25J 9/10; B25J 11/00; B25J 11/005; B25J 17/02; B25J 17/0266; B25J 17/0283; B25J 18/00; B25J 18/04; Y10S 901/24; Y10T 74/20317; Y10T 74/20329; Y10T 74/20335
USPC ............ 74/490.05, 490.06; 414/589; 901/29
See application file for complete search history.

(56) References Cited

U.S. PATENT DOCUMENTS

| | | | | |
|---|---|---|---|---|
| 5,065,062 A | * | 11/1991 | Uehara et al. | 310/114 |
| 6,047,610 A | * | 4/2000 | Stocco | B25J 17/0266 74/479.01 |
| 7,637,710 B2 | * | 12/2009 | Skutberg | B23Q 1/5462 414/735 |
| 2008/0295637 A1 | * | 12/2008 | Lessard | B25J 17/0266 74/490.05 |

(Continued)

FOREIGN PATENT DOCUMENTS

| | | |
|---|---|---|
| EP | 1870214 A1 | 12/2007 |
| WO | 03066289 A1 | 8/2003 |

(Continued)

OTHER PUBLICATIONS

International Preliminary Report on Patentability Application No. PCT/EP2011/064970 Completed: Sep. 12, 2012 12 pages.

(Continued)

*Primary Examiner* — Saul Rodriguez
*Assistant Examiner* — Brendan P Tighe
(74) *Attorney, Agent, or Firm* — Whitmyer IP Group LLC (57) ABSTRACT

An industrial robot including a manipulator for movement of an object in space. The manipulator includes a movable platform arranged for carrying the object, a first arm arranged for influencing the platform in a first direction and including a first inner arm part rotatable about a first axis, a second arm arranged for influencing the platform in a second direction and including a second inner arm part rotatable about a second axis, a third arm arranged for influencing the platform in a third direction and including a third inner arm part rotatable about a third axis.

15 Claims, 5 Drawing Sheets

(56) References Cited

U.S. PATENT DOCUMENTS

2009/0266194 A1* 10/2009 Zhang et al. .............. 74/490.01
2012/0232690 A1* 9/2012 Gilchrist et al. .............. 700/228

FOREIGN PATENT DOCUMENTS

WO           03078111 A1    9/2003
WO        2006106165 A1   10/2006

OTHER PUBLICATIONS

International Search Report and Written Opinion of the International Searching Authority Application No. PCT/EP2011/064970 Completed: Oct. 13, 2011; dated Nov. 2, 2011 7 pages.

* cited by examiner

INDUSTRIAL ROBOT INCLUDING A PARALLEL KINEMATIC MANIPULATOR

FIELD OF THE INVENTION

The present invention relates to an industrial robot including a manipulator for movement of an object in space, where the manipulator is a parallel kinematic manipulator.

A parallel kinematic manipulator includes a movable platform arranged for carrying the object, a first arm arranged for influencing the platform in a first direction and including a first inner arm part, a first outer arm part pivotally connected to the first inner arm part and to the platform, and a first actuator having a first drive shaft for actuating the first arm, a second arm arranged for influencing the platform in a second direction and including a second inner arm part, a second outer arm part pivotally connected to the second inner arm part and to the platform, and a second actuator having a second drive shaft for actuating the second arm, a third arm arranged for influencing the platform in a third direction and including a third inner arm part, a third outer arm part pivotally connected to the third inner arm part and to the platform, and a third actuator having a third drive shaft for actuating the third arm.

BACKGROUND OF THE INVENTION

An industrial robot includes a manipulator and a control unit having means for automatically operating the manipulator. There are different types of manipulators, such as a serial kinematic manipulator and a parallel kinematic manipulator. Today fast handling and assembly of components on a flat surface, such as the surface of a conveyor is typically performed by parallel kinematic manipulators.

A parallel kinematic manipulator (PKM) is defined as a manipulator comprising at least one stationary element, a movable element, denoted a platform, and usually three arms. Each arm comprises a link arrangement connected to the movable platform. Each arm is actuated by an actuator preferably arranged on the stationary element to reduce the moving mass. The link arrangements transfer forces to the movable platform. For a fully built-up parallel kinematic manipulator for movement of the platform with three degrees of freedom, three parallel-working arms are required. To obtain a stiff arm system with a large loading capacity and a low weight, the arms connected to the movable platform of the parallel kinematic manipulator should have a total of six links.

There exist different types of manipulators for fast material handling, pick and place, and assembly, such as the Scara manipulator, the Gantry manipulator, and the Delta PKM manipulator. The Delta PKM manipulators are taking market shares from especially the Scara manipulators, because of its lightweight arm structure, which provides higher dynamic performance in relation to manipulator manufacturing cost. However, the Scara manipulator has some features that cannot be achieved by the Delta manipulator, as for example small footprint, possibility to mount the manipulator beside the work space, possibilities to obtain a larger vertical stroke and the possibilities to make installations with a higher manipulator density. Looking at the kinematics, increasing the horizontal work space size means only that the arms of the Scara manipulator need to be resized while for the Delta manipulator the whole framework and the manipulator must be resized, which means that the manipulator will need to be located higher above the work space.

In order to combine the advantages of the traditional Scara kinematics with the performance potential of the Delta PKM manipulator, a Scara Tau PKM concept was developed. This concept is disclosed in WO 03/066289. The prior art Scara Tau manipulator has three inner arm parts mounted on three bearings, which are in turn mounted on a vertical column, which also holds the motors with its gear boxes. The output shaft from the gear box is connected to a gear wheel, which engages a gear ring mounted on the arm side of the arm bearing. Because the motor and gear box must be mounted with their shafts parallel with the rotation axes of the arms, a lot of space is needed between the arm bearings in order to get the space needed for the actuation system. This means that even if the robot obtains a small footprint it will need a lot of space in the vertical direction. This is especially a problem if the robot is used to serve for example a conveyor, especially if the robot must be mounted over the conveyor. Beside the need of a large space in the z-direction, the prior art robot will also be heavy because of the mounting column supporting the arms and the actuation system.

SUMMARY OF THE INVENTION

One object of the present invention is to provide a parallel kinematic robot, which is compact, less expensive than the disclosed Scara Tau manipulator, and has a large work space compared to the space it occupies, i.e. has a small footprint.

This object is achieved by an industrial robot according to the present teachings.

The robot includes a manipulator for movement of an object in space, where the manipulator comprises: a movable platform arranged for carrying the object, a first arm arranged for influencing the platform in a first direction and including a first inner arm part rotatable about a first axis, a first outer arm part pivotally connected to the first inner arm part and to the platform, and a first actuator for actuating the first arm, a second arm arranged for influencing the platform in a second direction and including a second inner arm part rotatable about a second axis, a second outer arm part pivotally connected to the second inner arm part and to the platform, and a second actuator for actuating the second arm, a third arm arranged for influencing the platform in a third direction and including a third inner arm part rotatable about a third axis, a third outer arm part pivotally connected to the third inner arm part and to the platform, and a third actuator for actuating the third arm, wherein the rotation axes of the inner arm parts are parallel. The robot is characterized in that the manipulator comprises a hollow part connected to the third inner arm part, and a support member extending through said hollow part and arranged to rigidly support at least one of the first and second actuators, and the third inner arm part is arranged rotatable about the support member. Preferably, the support member is vertically mounted in the work shop.

With the term "the support member is arranged to rigidly support at least one of the actuators" is meant that the support member is arranged to support the actuator in such a way that the mechanical stiffness of the mounting of the two components relative each other is high, which means that the stiffness of the support member and the mounting interfaces between the support member and the actuators are designed to be stiff. The support member may be arranged to support the actuator alone or as a part of a support structure supporting the actuator. It should be noticed that the support member can either be a specific mechanical member or be part of the encapsulation of the actuator. For example, the support member is mechanically rigidly connected to at least one of the first and second actuators, which means that the support structure and the actuator are mounted either in direct contact with each other or via one or more other components in such a way that the mechanical stiffness of the mounting of the two components relative each other is high.

The invention provides a possibility to make installations with a high manipulator density and is favorable when the robot is working from the side of, for example, a conveyor. This mounting also makes it easy to install and exchange the robot and the robot will be easily accessible for service and maintenance. Since it is possible to move the robot arms and platform outside the work space, cleaning and washing of the robot will be easier since it is not necessary to do this above, for example, a conveyor.

According to an embodiment of the invention, the hollow part is mounted on a bearing surrounding the support member. This will give the third inner arm part free rotation using high stiffness bearings as for example roller bearings.

According to an embodiment of the invention, a transmission unit is mechanically connected to the hollow part to rotatably drive the hollow part with the third actuator.

According to an embodiment of the invention, the transmission unit comprises a gear ring connected by at least one pinion gear to the drive shaft of the third actuator. This is a simple way to obtain a high gear ratio because of the relatively large diameter of the gear ring.

According to an embodiment of the invention, the third actuator is mechanically connected to the support member. This will give a compact design for the actuator, which will not need to output as much torque as the other actuators because of the gear ratio possible to obtain with the large diameter ring gear.

According to an embodiment of the invention, the centre line of the support member is parallel to the rotation axes of all the inner arm parts. When no angle tears are used this also means that the support member is parallel to all the drive shafts of the actuators. This gives the lowest influence of the gravity on the actuator torques.

According to an embodiment of the invention, at least two of the arms have an outer arm part including at least two links pivotally connected to the respective inner arm part and to the platform.

According to an embodiment of the invention, all of the three arms have an outer arm part including at least two links pivotally connected to the respective inner arm part and to the platform. This gives a symmetric link structure for the whole robot.

According to an embodiment of the invention, one of the arms has an outer arm part including three links pivotally connected to the respective inner arm part and to the platform. This will make it possible to obtain less variations of the stiffness of the robot.

BRIEF DESCRIPTION OF THE DRAWINGS

The invention will now be explained more closely by the description of different embodiments of the invention and with reference to the appended figures.

DETAILED DESCRIPTION OF THE INVENTION

Like or corresponding parts in the following figures are indicated with like numerals.

Figure 1:
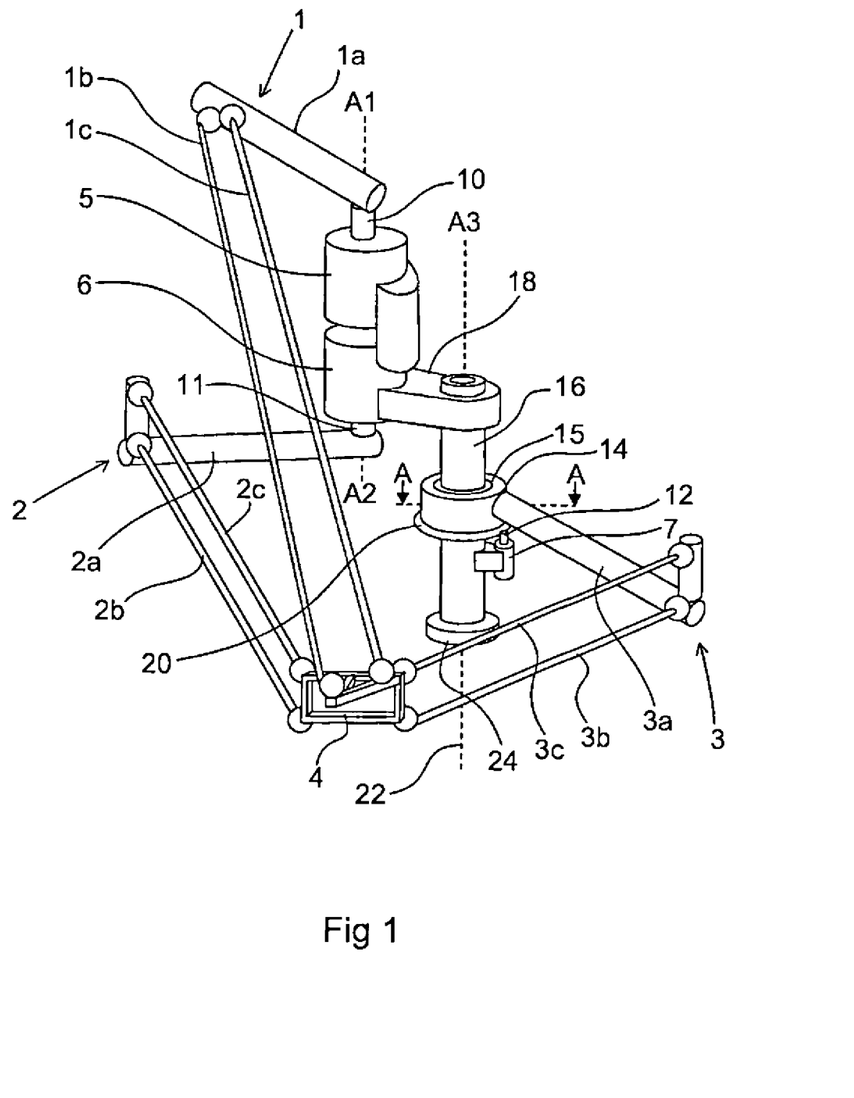
FIG. 1 shows a manipulator according to a first embodiment of the invention.

FIG. 1 shows an example of a manipulator of an industrial robot according to the invention. The industrial robot also includes a control system (not shown in the figure) for controlling the movements of the manipulator. The manipulator comprises a movable platform 4 arranged for carrying a wrist and/or an object, such as a tool or a work piece. The manipulator includes three arms 1-3. The first arm 1 is arranged for influencing the platform 4 in mainly a vertical direction and includes a first inner arm part 1*a* rotatable about a first axis A1, a first outer arm part including two links 1*b*, 1*c* pivotally connected to the first inner arm part 1*a* and to the platform 4, and a first actuator 5 for actuating the first arm 1. The second arm 2 is arranged for influencing the platform in a first mainly horizontal direction and includes a second inner arm part 2*a* rotatable about a second axis A2, a second outer arm part including two links 2*b*, 2*c* pivotally connected to the second inner arm part 2*a* and to the platform 4, and a second actuator 6 for actuating the second arm 2. The two links 2*b*, 2*c* are arranged in parallel and have the same length.

The third arm 3 is arranged for influencing the platform 4 in a second mainly horizontal direction. The third arm 3 includes a third inner arm part 3*a* rotatable about a third axis A3 and a third outer arm part including two links 3*b*, 3*c* pivotally connected to the third inner arm part 3*a* and to the platform 4, and a third actuator 7 for actuating the third arm. Each of the actuators 5-7 includes a drive shaft 10, 11, 12. In the embodiment shown in FIG. 1, all three drive shafts are arranged vertically and in parallel. The drive shaft 12 is actually just a shaft with a pinion gear to transmit torque to a gear ring 20 and using angle gear design. The shaft 12 does not have to be parallel with the actuator shafts 10 and 11. However, the rotation axis of the ring gear 20 and thus the third rotation axis of the third inner arm part 3*a* must always be parallel with the actuator shafts 10 and 11, or in the general case, the rotation axes of all the inner arm parts 1*a*, 2*a* and 3*a* must be parallel. The drive shafts 10 and 11 and the drive transmission 12, 20 are arranged to support the inner arm parts at three different levels in the vertical direction. The first and second drive shafts are arranged coaxial, but they could also be mounted with an offset in the horizontal direction. The first actuator is arranged above the second actuator. The third shaft is arranged displaced in a horizontal direction from the first and second drive shafts. All of the three arms have an outer arm part including two links pivotally connected to the respective inner arm part and to the platform.

The second inner arm part 2*a* is displaced relative the third inner arm part 3*a* in the direction of the drive shafts 10 and 11 to allow the third inner arm part 3*a* to pass below the second inner arm part 2*a*, as shown in the figure, and accordingly to increase the work space of the robot.

Each of the actuators 5, 6, 7 comprises a motor and a gear box including an output drive shaft. It should be noted that the gear ratio of the third actuator 7 does not need to be as high as for the other actuators 5 and 6 since the gear ring 20 is used to obtain a gear with high gear ratio. The first and second inner arm parts 1a, 2a are mounted directly on the output shafts of the actuators 5, 6 with gear boxes driven by motors. The first inner arm part 1a is attached to a part of the first output shaft 10, which extends above the motor and gear of the first actuator 5. The second inner arm part 2a is attached to a part of the second output shaft 11, which extends below the motor and gear of the second actuator 6. The third inner arm part 3a is attached to a hollow part 14, which is operatively connected to the third output shaft 12 via a small diameter pinion gear and a large diameter gear ring 20, and which is arranged rotatable about a support member 16 by means of a bearing 15. The third output shaft 12 supports the pinion gear driving the gear ring and extending above the third actuator 7. If actuator 7 is mounted inside the support member 16 and there is a hole in the support member through which the gear on the motor shaft can meet a gear ring with the gear teeth on the inside of the ring, the actuator 7 can have its shaft 7 pointing either upwards or downwards.

Figure 2:
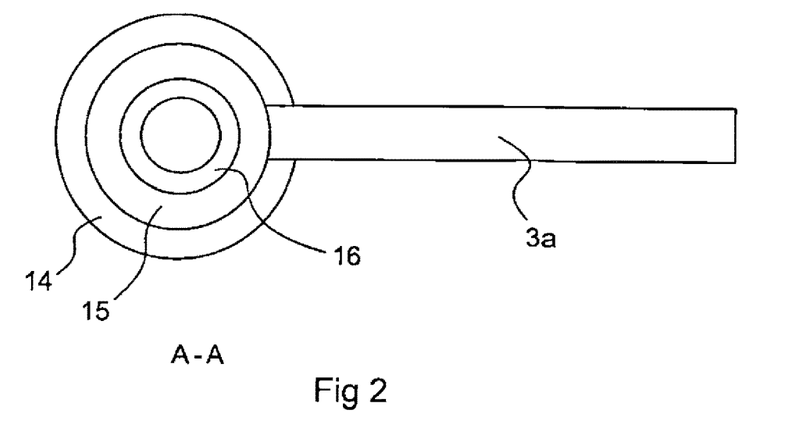
FIG. 2 shows a cross section through the manipulator shown in FIG. 1 along a line A-A.

FIG. 2 shows a cross section through the manipulator shown in FIG. 1 along a line A-A where the hollow part 14 for the third inner arm part 3a is situated. One end of the third inner arm part 3a is connected to the hollow part 14 and the other end of the third inner arm part 3a is connected to the third outer arm part 3b-c. The manipulator includes a cylindrical support member 16 extending through the hollow part 14. The hollow part 14 is designed to allow the support member 16 to extend through the hollow part. In this embodiment the hollow part 14 is ring shaped. The first and second actuators 5,6 are rigidly connected to the support member 16 via an attachment 18. The third actuator 7 is rigidly connected to the support member 16 but could also be placed on a separate stand directly on the floor. The centre line 22 of the support member 16 is parallel to the rotation axes of all the inner arm parts 1a, 2a and 3a. The third inner arm part 3a is arranged rotatable about the support member 16 by means of a bearing 15. This bearing can either be located inside the hollow part 14 between the hollow part and the support member 16 as in the FIG. 2, or being arranged above or below the hollow part. It is also possible to have one bearing below and one bearing above the hollow part. When the bearing is not mounted inside the hollow part the diameter of the hollow part can be reduced.

A transmission including a ring gear 20 and a pinion gear on the shaft 12 rotatably connects the hollow part 14 to the third actuator 7. In FIG. 1 the gears on the gear ring are pointing outwards, but it is also possible to have the gears pointing inwards or having an angled ring gear. The pinion gear will then be adapted to the solution used.

In the embodiment of the invention according to FIGS. 1 and 2, the cylindrical pillar 16 is standing on the floor by means of a mounting plate 24. The pillar 16 is hollow to contain cabling and hoses, and an attachment 18 is used to mount the servo actuators 5,6 on the pillar while the attachment 18 connects the servo actuators 5,6 to each other. Of course, the mounting of the servo actuators 5,6 on the pillar 18 can be made in different ways.

The third inner arm part 3a is mounted in such a way that it can pass under the second inner arm part 2a. The second arm 2 can rotate free until it hits the part of the pillar 16 which is between the hollow part 14 and the mounting arrangement 18. To increase the work space the pillar 16 can be made narrower where the second inner arm part 2a collides with the pillar. In FIG. 1 it is also shown how the upper joints of links 1b-c are mounted close to each other to reduce the rotations of the platform when it is moved in a radial direction in relation to the centre of the work space. This actuator mounting can also be used when the link 1c is moved from the first inner arm part 1a to the second inner arm part 2a, see FIG. 3.

Figure 3:
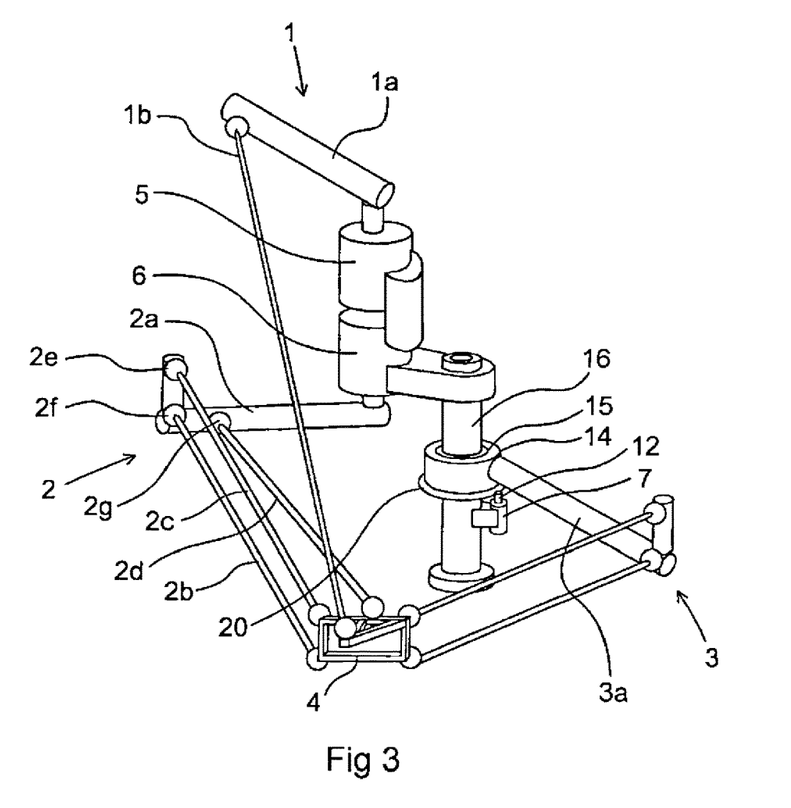
FIG. 3 shows a manipulator according to a second embodiment of the invention.

FIG. 3 shows a manipulator according to a second embodiment of the invention. This manipulator differs from the manipulator shown in FIG. 1 in that the first outer arm part includes only one link 1b pivotally connected by joints to the first inner arm part 1a and to the platform 4, and in that the second outer arm part includes three links 2b-d pivotally connected to the second inner arm part 2a and to the platform 4. The yaw angle of the platform 4 is here constrained by the link 2d. In FIG. 1 it is the pair of links 1b and 1c that constrains the yaw angle. Also here the platform rotations when the platform moves in a radial direction can be reduced by mounting the joint 2g close to a line between the joints 2e-f connecting the links 2b-c with the second inner arm part 2a. Seen both from above and from the side, the link 2d is not parallel with the parallel links 2b-c. This will reduce the yaw variations of the platform when it is moved in the work space.

Figure 4:
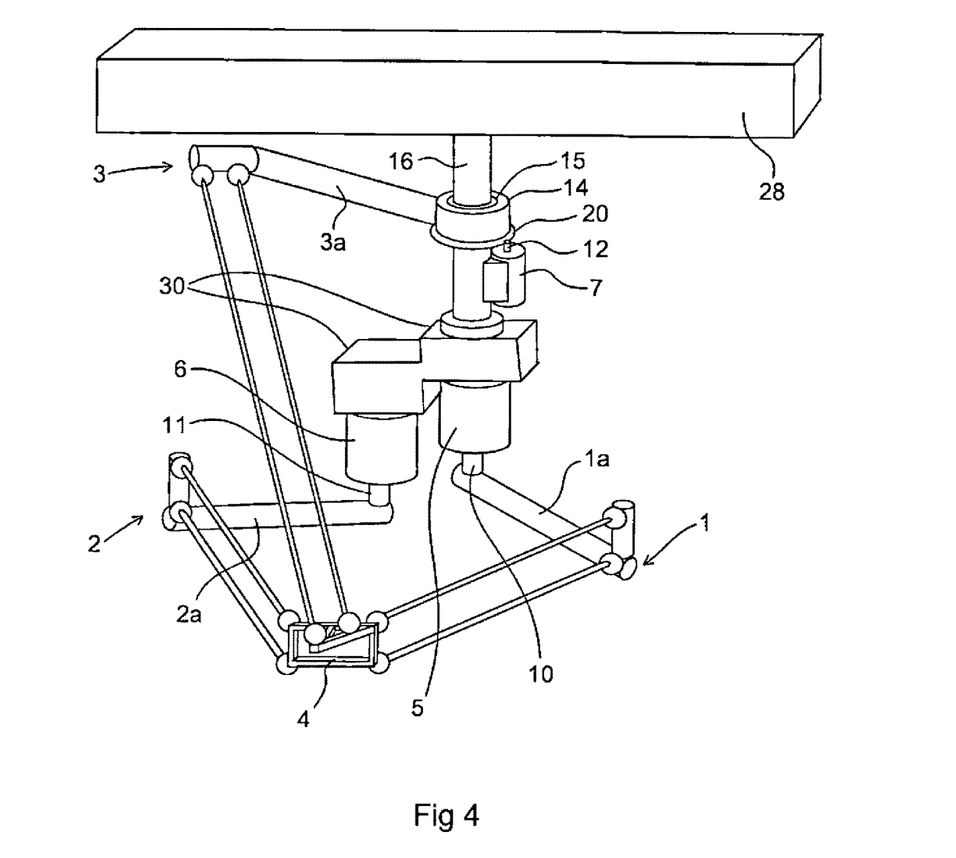
FIG. 4 shows a manipulator according to a third embodiment of the invention.

FIG. 4 shows a manipulator according to a third embodiment of the invention. The manipulator shown in FIG. 4 differs from the manipulator shown in FIG. 1 in that the third arm 3 is arranged for influencing the platform 4 in mainly a vertical direction, and the first arm 1 is arranged for influencing the platform 4 in a mainly horizontal direction. Further, the first and second actuators 5, 6 are arranged displaced in a horizontal direction. The support member 16 is connected to a roof beam 28. The first and second actuators 5, 6 are rigidly connected to the support member 16 via supporting elements 30. The third actuator 7 is rigidly connected to the support member 16. The third inner arm part 3a is mounted on the hollow part 14 driven by the third actuator 7 having a drive shaft 12 engaging the gear teeth of the gear ring 20 in the same way as in FIG. 1. In this way the same robot structure mounted on the floor as in FIGS. 1 and 3 can also be mounted in the roof above the work space, which is necessary in some applications where all the space around the work space must be accessible.

Figure 5:
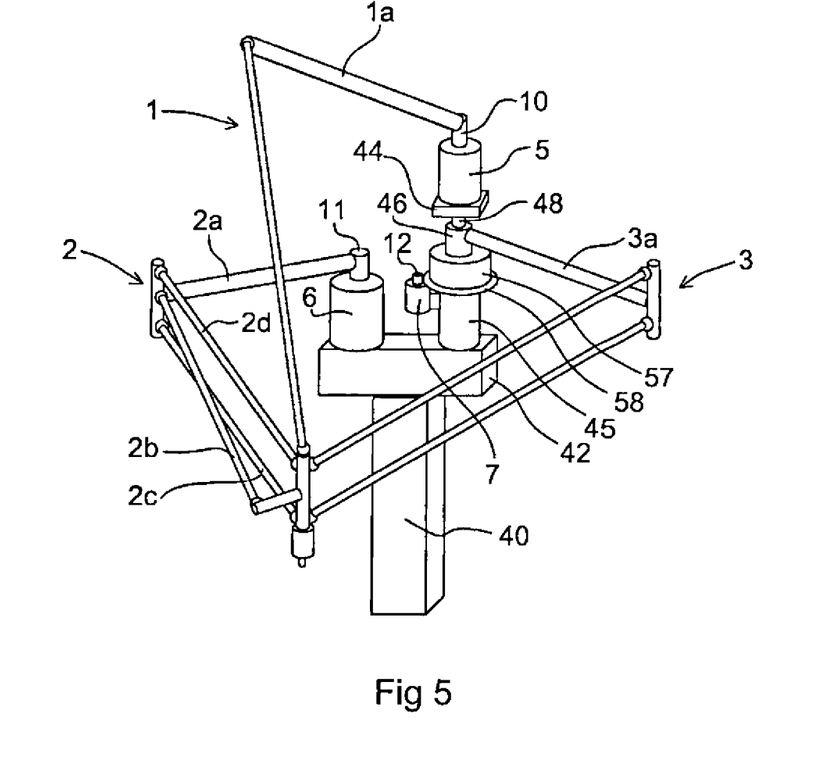
FIG. 5 shows a manipulator according to a fourth embodiment of the invention.

FIG. 5 shows a manipulator according to a fourth embodiment of the invention. It can be used to increase the work space when the actuators are mounted directly on a vertical application dependent support structure. The support structure of the embodiment shown in FIG. 5 comprises a vertically arranged support beam 40, a first holding device 42 on which the second actuator 6 is mounted, a second holding device 44 on which the first actuator 5 is mounted, and a distance piece 45 arranged to displace the third inner arm part 3a from the second inner arm part 2a in the direction of the shaft 12. The third actuator 7 is rigidly connected to the distance piece 45. The support structure further comprises a support member 48 arranged to rigidly support the first actuator 5. One end of the support member 48 is attached to the first holding device 42 and the other end is attached to the second holding device 44. The first actuator 5 is rigidly connected to the support member 48 via the second holding device 44. The centre line of the support member 48 is parallel to the rotation axes of the inner arm parts 1a, 2a and 3a. The third inner arm part 3a is mechanically connected to a hollow part 46 including a though hole to receive the support member 48. The support member extends through the hollow part 46.

The arrangement for actuating the third inner arm part 3a shown in FIGS. 1-4 is now used to get a support member for only actuator 5. Thus the support member 48 corresponds to the support member 16 in FIGS. 1-4. Below the gear ring 58, the support member 48 has a larger diameter. The third inner arm part 3a is mounted on the hollow part 46 corresponding to the hollow part 14 in FIG. 2. However, here the bearing 57 is mounted below the hollow part 46. As for FIGS. 1-4, an actuator 7 drives the hollow part 46 via the gear ring 58 and a pinion gear on the shaft 12. The actuator is mounted on the distance piece 45 below the gear ring 58.

Figure 6:
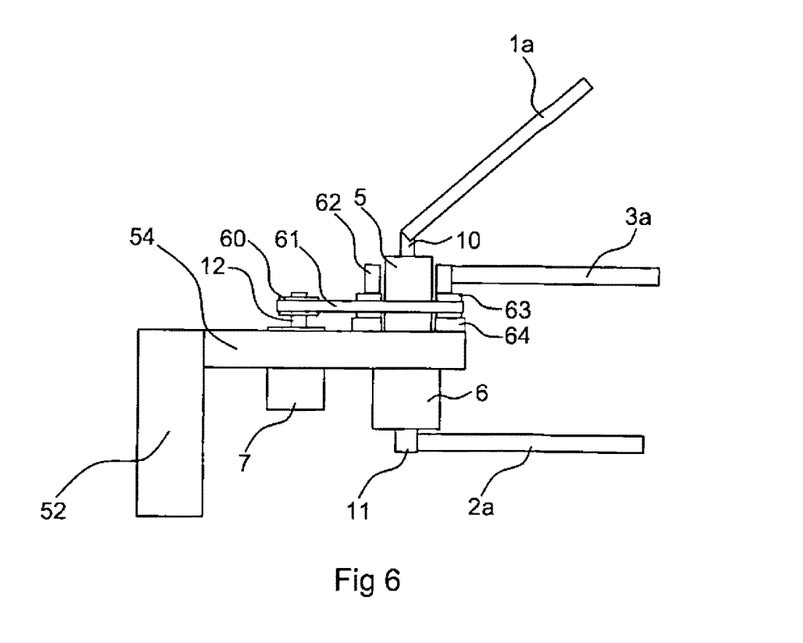
FIG. 6 shows a manipulator according to a fifth embodiment of the invention.

FIG. 6 shows a manipulator according to a sixth embodiment of the invention. It is here shown that it is also possible to use a band transmission between the third actuator 7 and the hollow part, which will be a cheaper solution, but with less transmission stiffness. The manipulator comprises a holding device 54 and a pillar 52 for positioning the holding device 54. The manipulator comprises a first actuator 5, a second actuator 6, and a third actuator 7, which are mounted on the holding device 54. The first actuator 5 includes a first drive shaft 10, the second actuator 6 includes a second drive shaft 11, and the third actuator 7 includes a third drive shaft 12, which is operatively connected to a hollow shaft 62 by means of a belt 61. The first actuator 5 is mounted inside the hollow shaft 62.

The hollow shaft 62 is concentrically mounted on a belt wheel 63, which in turn is mounted concentrically on a bearing 64 making it possible to rotate the third inner arm part 3a in relation to the holding device 54. The output shaft of the actuator has a smaller belt wheel and the belt 61 is mounted between the two belt wheels 60 and 63. The arrangement with a belt driven hollow part for the third arm 3 can also be implemented in the manipulator configurations shown in FIGS. 1-5. Specific for this implementation is that the support member inside the hollow part is the encapsulation of the first actuator 5. This solution is difficult to apply in the manipulator configurations shown in FIGS. 1, 3 and 4. The advantage to have the first actuator 5 inside the hollow shaft 62 is that the actuator assembly will be more compact, compared with FIG. 5.

Figure 7:
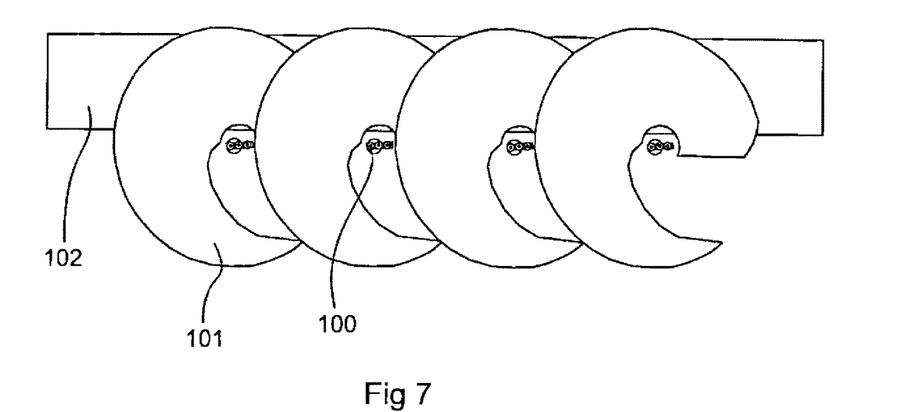
FIG. 7 illustrates the work areas covered by a plurality of closely packed manipulators according to the embodiments of the invention shown in the previous figures.

FIG. 7 shows the work area covered by a plurality of closely packed manipulators of any of the embodiments shown in FIGS. 1-6. In FIG. 7 only the actuators 100 of the manipulator are shown. The manipulators are intended to perform pick- and place operations on a conveyor 102. As can be seen from FIG. 7, the work spaces 101 of the manipulators are overlapping, which achieves high capacity. Moreover it can be seen that the work space extends far outside the conveyor thereby facilitating cleaning, maintenance and tool exchange.

What is claimed is:

1. An industrial robot including a manipulator for movement of an object in space, where the manipulator comprises:
    a movable platform arranged for carrying the object,
    a first arm arranged for influencing the platform in a first direction and including a first inner arm part rotatable about a first axis, a first outer arm part pivotally connected to the first inner arm part and to the platform, and a first actuator including a first drive shaft for actuating the first arm parts, and the first inner arm part is directly mounted on the first drive shaft,
    a second arm arranged for influencing the platform in a second direction and including a second inner arm part rotatable about a second axis, a second outer arm part pivotally connected to the second inner arm part and to the platform, and a second actuator including a second drive shaft for actuating the second arm parts, and the second inner arm part is directly mounted on the second drive shaft,
    a third arm arranged for influencing the platform in a third direction and including a third inner arm part rotatable about a third axis, a third outer arm part pivotally connected to the third inner arm part and to the platform, and a third actuator including a third drive shaft for actuating the third arm parts, wherein the rotation axes of the first, second and third inner arm parts are parallel,
    a hollow part operatively connected to the third drive shaft via a transmission unit, and
    a support member extending through said hollow part and arranged to rigidly support at least one of the first and second actuators, and the hollow part is arranged rotatable about the support member.

2. The robot of claim 1, wherein said hollow part is mounted on at least one bearing surrounding the support member.

3. The robot of claim 1, wherein the transmission unit comprises a gear ring connected by at least one pinion gear to a drive shaft of the third actuator.

4. The robot of claim 1, wherein the third actuator is mechanically connected to the support member.

5. The robot of claim 1, wherein the centre line of the support member is parallel to the rotation axes of all the inner arm parts.

6. The robot of claim 1, wherein at least two of the arms have an outer arm part including at least two links pivotally connected to the inner arm part and to the platform.

7. The robot of claim 1, wherein all of the three arms have an outer arm part including at least two links pivotally connected to the inner arm part and to the platform.

8. The robot of claim 1, wherein one of the arms has an outer arm part including three links pivotally connected to the inner arm part and to the platform.

9. The robot of claim 1, wherein the support member is arranged to rigidly support the first, second, and third actuators.

10. The robot of claim 1, wherein the transmission unit is a single transmission unit.

11. The robot of claim 1, wherein the manipulator further includes one or more support elements rigidly connected to the support member and protruding from the support element in a radial direction.

12. The robot of claim 11, wherein the first and second actuators are rigidly connected to the support member via the one or more support elements, and at least one of the first and second actuators are displaced from the third actuator in a radial direction.

13. The robot of claim 1, wherein the first actuator includes a motor and a gear box, the gear box having the first drive shaft.

14. The robot of claim 1, wherein the second actuator includes a motor and a gear box, the gear box having the second drive shaft.

15. The robot of claim 1, wherein the third actuator includes a motor and a gear box, the gear box having the third drive shaft.

* * * * *